(12) United States Patent
Song

(10) Patent No.: US 8,952,970 B2
(45) Date of Patent: Feb. 10, 2015

(54) RENDERING PROCESSING APPARATUS AND METHOD USING MULTIPROCESSING

(75) Inventor: Hwajun Song, Seoul (KR)

(73) Assignee: Tobesoft Co., Ltd., Seoul (KR)

( * ) Notice: Subject to any disclaimer, the term of this patent is extended or adjusted under 35 U.S.C. 154(b) by 253 days.

(21) Appl. No.: 13/613,302

(22) Filed: Sep. 13, 2012

(65) Prior Publication Data

US 2014/0043345 A1 Feb. 13, 2014

(30) Foreign Application Priority Data

Aug. 13, 2012 (KR) ........................ 10-2012-0088229

(51) Int. Cl.
*G06F 15/80* (2006.01)

(52) U.S. Cl.
USPC .......................................... 345/505

(58) Field of Classification Search
None
See application file for complete search history.

(56) References Cited

U.S. PATENT DOCUMENTS

| | | | | |
|---|---|---|---|---|
| 7,075,541 B2 * | 7/2006 | Diard | ............................ | 345/505 |
| 2012/0254732 A1 * | 10/2012 | Proux et al. | .................... | 715/240 |
| 2013/0275996 A1 | 10/2013 | Kurihara et al. | | |

FOREIGN PATENT DOCUMENTS

| | | |
|---|---|---|
| JP | 08-138060 | 5/1996 |
| JP | 2003-510704 | 3/2003 |
| JP | 2007-172454 | 7/2007 |
| KR | 1020110000532 | 1/2011 |
| WO | 2012086041 | 6/2012 |

OTHER PUBLICATIONS

JP Office Action dated May 13, 2013; Application No. 2012-207021.
KR Office Action dated Oct. 23, 2013; Application No. 10-2012-0088229.

* cited by examiner

*Primary Examiner* — James A Thompson
(74) *Attorney, Agent, or Firm* — Young & Thompson

(57) ABSTRACT

A rendering processing apparatus and method using multiprocessing are disclosed. The rendering processing method includes dividing an application execution window into frames and generating a rendering processing command for rendering processing of an image on a frame basis by a pre-rendering manager, generating a rendering image for a frame according to the generated rendering processing command by a rendering manager, and storing the generated rendering image in a memory. A task for generating a rendering processing command is divided into at least one task, a task for generating a rendering image is divided into at least one task, and the divided tasks can be processed simultaneously in a plurality of threads.

9 Claims, 5 Drawing Sheets

RENDERING PROCESSING APPARATUS AND METHOD USING MULTIPROCESSING

This application claims the benefit of Korean Patent Application No. 10-2012-0088229, filed on Aug. 13, 2012, which is hereby incorporated by reference as if fully set forth herein.

BACKGROUND OF THE INVENTION

1. Field of the Invention

The present invention relates to a rendering processing apparatus and method, and more particularly, to a rendering processing apparatus and method using multiprocessing, which can maximize rendering processing performance by dividing a rendering processing command generation part and a drawing processing part and processing the divided parts in a plurality of threads, when an image is processed on a frame basis.

2. Discussion of the Related Art

In conventional rendering, a single-core Central Processing Unit (CPU) processes an image through double buffering in a single process without using a thread, or generates a whole screen by creating one thread in the presence of a performance issue.

FIG. 1 is an exemplary diagram illustrating a conventional rendering method. Referring to FIG. 1, the conventional rendering method suffers from a slow rendering processing speed because only one thread (a single task) is processed in a shared memory.

The conventional rendering method takes much time to process images included in a plurality of frames. Accordingly, considering the recent development of multi-core CPUs, that is, CPUs having 4 or more cores for devices such as a laptop computer, a PC, a tablet PC, or a smart phone, there exists a need for a technique for fast processing an image.

SUMMARY OF THE INVENTION

Accordingly, the present invention is directed to a rendering processing apparatus and method using multiprocessing that substantially obviate one or more problems due to limitations and disadvantages of the related art.

An object of the present invention is to provide a rendering processing apparatus and method using multiprocessing, for improving image processing performance by dividing a command generation part and a drawing processing part and simultaneously processing the divided parts, when an image is processed on a frame basis.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In an aspect of the present invention, a rendering processing method using multiprocessing includes dividing an application execution window into frames and generating a rendering processing command for rendering processing of an image on a frame basis by a pre-rendering manager, generating a rendering image for a frame according to the generated rendering processing command by a rendering manager, and storing the generated rendering image in a memory. A task for generating a rendering processing command is divided into at least one task, a task for generating a rendering image is divided into at least one task, and the divided tasks can be processed simultaneously in a plurality of threads.

The divided tasks may be sequentially processed on a frame basis.

The rendering image may be formed in a form of a bitmap.

When a Scene Graph (SC) optimizer determines that a plurality of processing requests are successively received for generation of a same image at a same coordinates in a frame by scanning a pre-rendering queue that receives the rendering processing requests, processing of only one of the plurality of processing requests may be controlled.

A program that performs the rendering processing method may be recorded to a computer-readable recording medium.

In another aspect of the present invention, a rendering processing apparatus using multiprocessing includes a pre-rendering manager for dividing an application execution window into frames and generating a rendering processing command for rendering processing of an image on a frame basis, a rendering manager for generating a rendering image for a frame according to the generated rendering processing command, and a memory for storing the generated rendering image. A task for generating a rendering processing command in the pre-rendering manager is divided into at least one task, a task for generating a rendering image in the rendering manager is divided into at least one task, and the divided tasks can be processed simultaneously in a plurality of threads.

The divided tasks may be sequentially processed on a frame basis.

The rendering manager may generate the rendering image in a form of a bitmap.

The pre-rendering manager may include a pre-rendering queue for receiving an image processing event command, and an SC optimizer for, if determining that a plurality of rendering processing requests are successively received for generation of a same image at a same coordinates in a frame by scanning the pre-rendering queue, controlling processing of only one of the plurality of processing requests.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

A rendering processing apparatus and method using multiprocessing according to an embodiment of the present invention will be described below with reference to the attached drawings.

In the present invention, rendering is an image process, such as a process of configuring a new window by generating a new image corresponding to an event, upon occurrence of the event on a window displayed on a display by executing an application.

In the present invention, a thread is a unit of a flow executed in a program, particularly a process.

Figure 1:
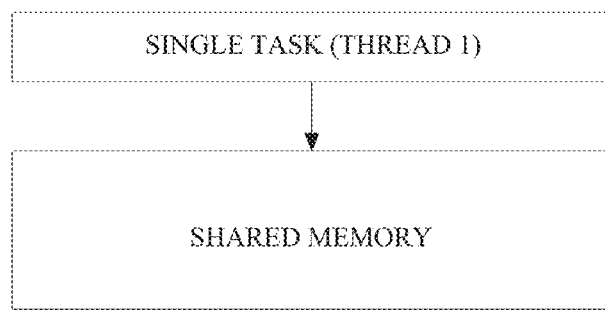
FIG. 1 is an exemplary diagram illustrating a conventional rendering method.
Figure 2:
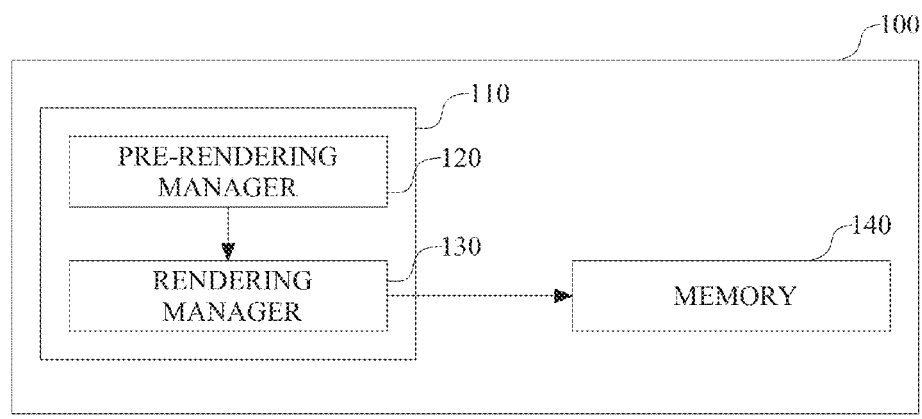
FIG. 2 is a block diagram of a rendering processing apparatus using multiprocessing according to an embodiment of the present invention.

FIG. 2 is a block diagram of a rendering processing apparatus using multiprocessing according to an embodiment of the present invention.

Referring to FIG. 2, a rendering processing apparatus 100 using multiprocessing includes a rendering engine 110 and a memory 140.

The memory 140 may store an Operating System (OS), applications, and data files.

The rendering engine 110 includes a pre-rendering manager 120 and a rendering manager 130.

The pre-rendering manager 120 generates a final rendering command by storing and managing information needed for rendering before rendering.

Specifically, the pre-rendering manager 120 divides an application execution window into frames and generates a rendering processing command for rendering processing of the image of at least one frame.

Figure 3:
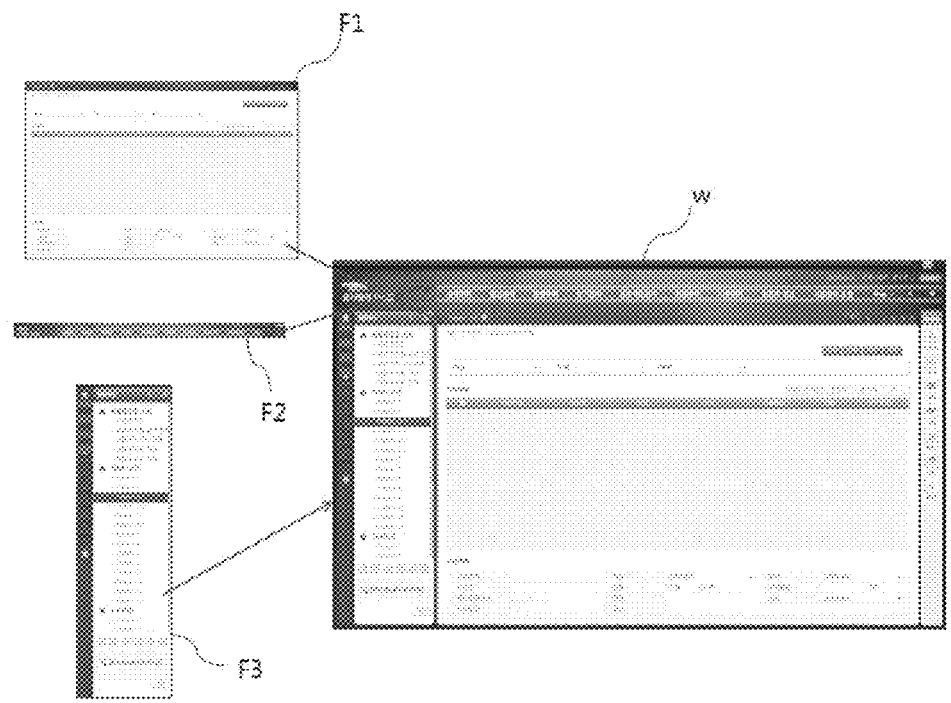
FIG. 3 illustrates an exemplary window to which a rendering processing method using multiprocessing according to an embodiment of the present invention is applied.

FIG. 3 illustrates an exemplary window to which a rendering processing method using multiprocessing according to an embodiment of the present invention is applied.

Referring to FIG. 3, upon execution of an application, an application execution window W is displayed. The window W may be divided into different frames F1, F2 and F3.

In the case where rendering processing is performed on a window basis, upon occurrence of an event in a specific frame, the whole window is subjected to rendering processing even though existing images are maintained in the other frames. As a result, a rendering processing speed may be decreased.

In contrast, the present invention can increase an image processing speed by dividing a window into frames and processing an image on a frame basis.

Meanwhile, the rendering manager 130 is a rendering module that creates an image by sequentially processing rendering processing commands generated from the pre-rendering manager 120 and thus performing drawing in an intended buffer.

The rendering manager 130 may create an image in the form of a bitmap.

The task of generating a rendering processing command in the pre-rendering manager 120 and the task of generating a rendering image in the rendering manager 130 may be executed separately. These two tasks may be processed in a plurality of threads.

The rendering processing command generation task involves calculations such as calculation of an area for a rendering processing command and generation of the rendering processing command by identifying an object to be rendered. The rendering image generation task is a task of generating a rendering image according to a rendering processing command.

Figure 4:
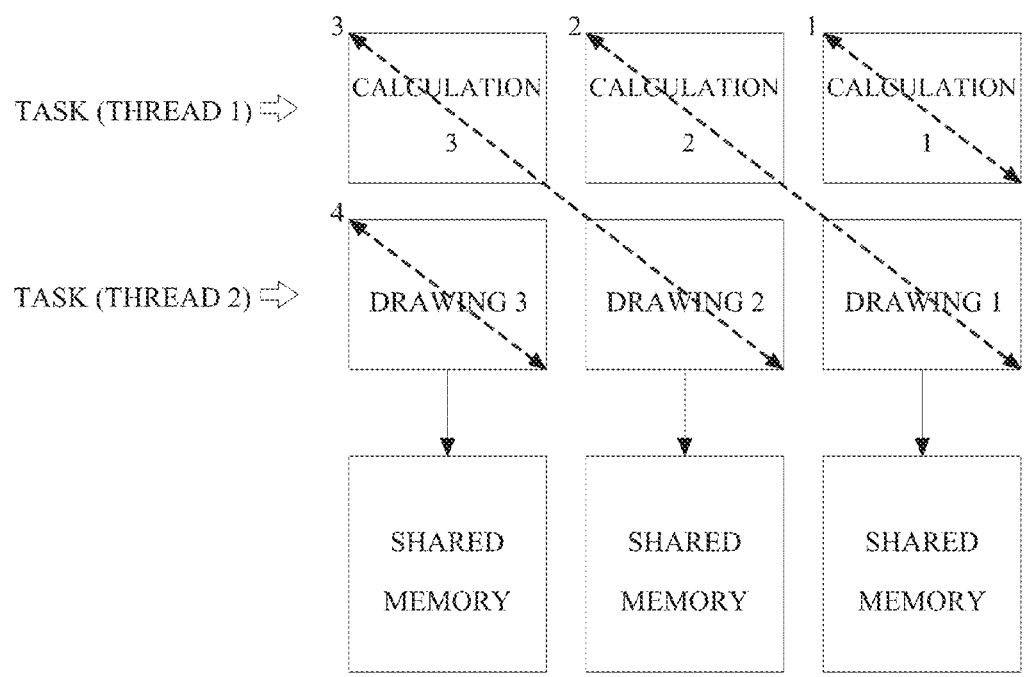
FIG. 4 is an exemplary diagram illustrating the rendering processing method using multiprocessing according to the embodiment of the present invention.

FIG. 4 is an exemplary diagram illustrating the rendering processing method using multiprocessing according to the embodiment of the present invention.

In the illustrated case of FIG. 4, tasks are processed in a plurality of threads, when images of three frames are processed.

Referring to FIG. 4, the rendering manager 130 divides the rendering command generation task for image 1, image 2, and image 3 into calculation 1, calculation 2, and calculation 3, respectively, and divides the rendering image generation task for image 1, image 2, and image 3 into drawing 1, drawing 2, and drawing 3, respectively. Then the rendering manager 130 performs the tasks in two threads.

In case of a single thread, a total of 6 tasks are sequentially processed.

In case of two threads, a first process (calculation 1), a second process (calculation 2 and drawing 1), a third process (calculation 3 and drawing 2), and a fourth process (drawing 3) are sequentially performed. Since the rendering processing command generation task and the rendering image generation task are performed simultaneously in the two threads at specific time points (e.g. the second, and third processes), a task processing speed can be increased.

To further increase the image processing speed, the pre-rendering manager 120 may divide the rendering processing command generation task into a plurality of tasks and perform the plurality of tasks in a plurality of threads.

Figure 5:
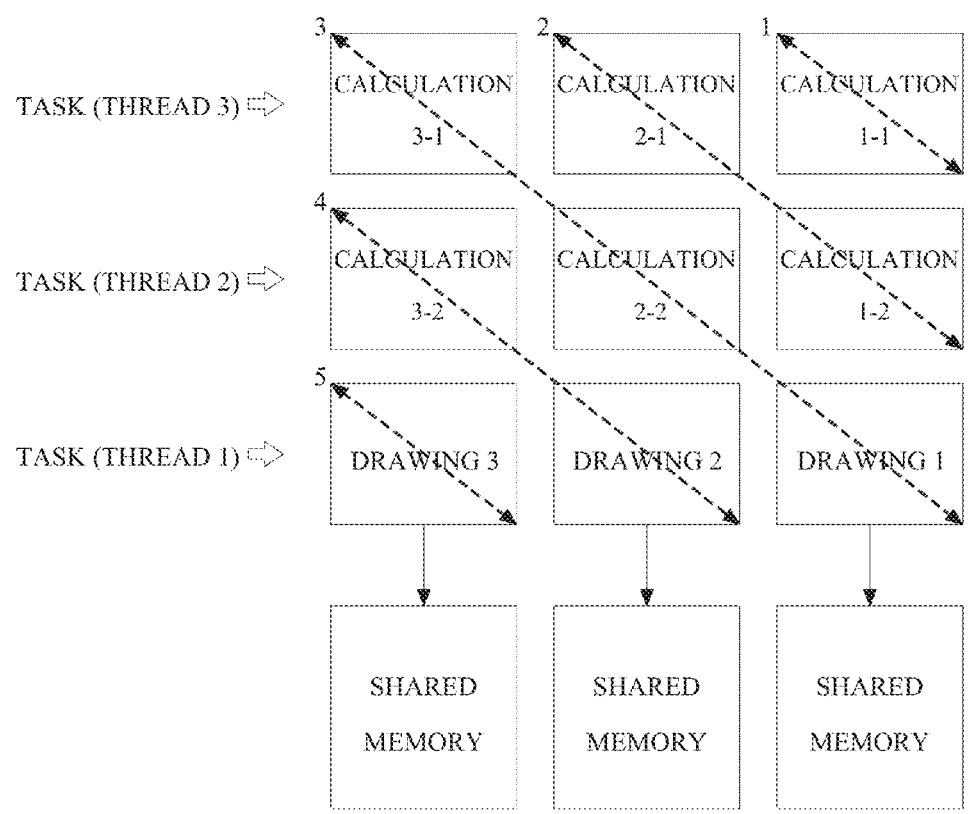
FIG. 5 is another exemplary diagram illustrating the rendering processing method using multiprocessing according to the embodiment of the present invention.

FIG. 5 is another exemplary diagram illustrating the rendering processing method using multiprocessing according to the embodiment of the present invention.

Referring to FIG. 5, the rendering manager 130 divides a rendering processing command generation part for each of image 1, image 2, and image 3 into two parts, that is, calculations 1-1 and 1-2, calculations 2-1 and 2-2, and calculations 3-1 and 3-2 and divides a rendering image generation part for image 1, image 2, and image 3 into drawing 1, drawing 2, and drawing 3.

When the parts are performed using task (thread 1), task (thread 2), and task (thread 3), a first process (calculation 1-1), a second process (calculations 1-2 and 2-1), a third process (calculations 3-1 and 2-2 and drawing 1), a fourth process (calculation 3-2 and drawing 2), and a fifth process (drawing 3) are sequentially performed.

Because a plurality of divided rendering processing command generation parts and a plurality of divided rendering image generation parts are processed simultaneously in a plurality of threads at specific processing time points, the rendering processing speed can further be increased.

Subsequently, the generated rendering image is stored in the memory 140.

Now a detailed description will be given of the configurations and functions of the pre-rendering manager 120 and the rendering manager 130 of the rendering engine 110.

Figure 6:
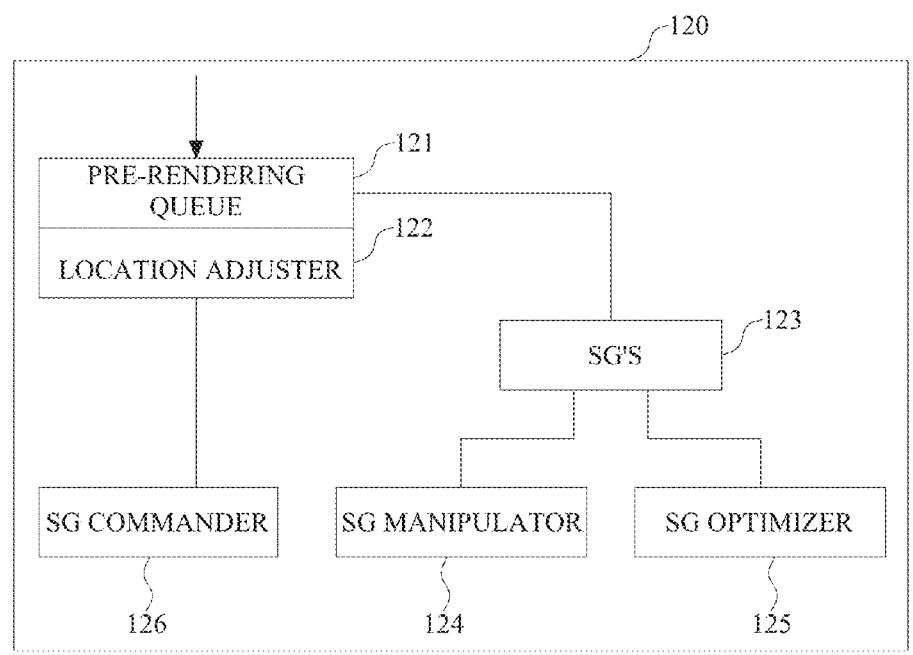
FIG. 6 is a detailed block diagram of a pre-rendering manager in the rendering processing apparatus using multiprocessing according to the embodiment of the present invention.

FIG. 6 is a detailed block diagram of the pre-rendering manager in the rendering processing apparatus using multiprocessing according to the embodiment of the present invention.

Referring to FIG. 6, the pre-rendering manager 120 includes a pre-rendering queue 121, a location adjuster 122, a plurality of Scene Graphs (SGs) 123, an SG manipulator 124, an SG optimizer 125, and an SC commander 126.

The pre-rendering queue 121 receives a rendering processing request and generates a rendering processing command corresponding to the received rendering processing request.

The rendering processing request inputted to the pre-rendering queue 121 may be considered in three cases. First of all, a command may be input through an element interface. Another case is that when a request regarding specific coordinates of a screen displayed on a display is received, the pre-rendering queue 121 may receive a command regarding an element at the coordinates from a hittest manager (not shown) of the rendering engine 110. Finally, the pre-rendering queue 121 may receive a command from a canvas module including a drawing interface and a painter.

The location adjuster 122 is a module for processing location information. The location adjuster 122 performs an Update Rect process, taking into account correction and transformation of rendering coordinates.

The location adjuster 122 may exclude a covered part of a frame of a window behind another overlapping window on the display from a rendering processing area in order to avoid rendering processing of the covered part.

The SGs 123 store and manage information to be maintained for rendering. The SGs 123 correspond to depth-first acyclic graphs. In addition, the SGs 123 represent a drawing order and an inclusion relationship, determine an object to be rendered in an updated area, and generate a rendering processing command from a determined node.

The SG manipulator 124 adds, deletes, inserts, or moves a node of the SGs 123. The SG manipulator 124 also changes the contents of the SGs 123.

The SG optimizer 125 performs optimization based on the contents of the SGs 123.

Especially, when determining that rendering processing requests for generation of the same image at the same coordinates in a frame are successively received by scanning the pre-rendering queue 121, the SG optimizer 125 may control processing only one of the rendering processing requests.

The SG commander 126 generates a rendering processing command for an updated area generated by the location adjuster 122.

The hittest manager processes hittest information and determines an element that has been hit with respect to requested coordinates. The hittest manager executes a rendering processing request and processes a response through the pre-rendering queue 121 in order to use the SGs 123.

Figure 7:
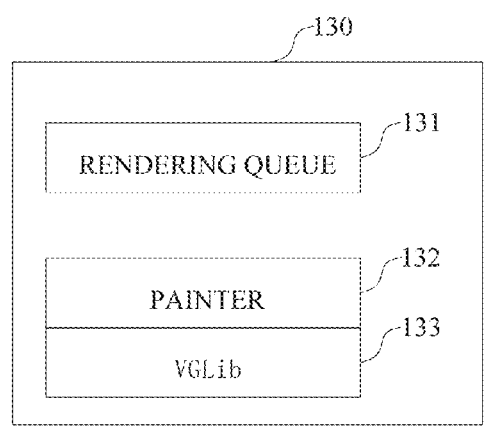
FIG. 7 is a detailed block diagram of a rendering manager in the rendering processing apparatus using multiprocessing according to the embodiment of the present invention.

FIG. 7 is a detailed block diagram of the rendering manager in the rendering processing apparatus using multiprocessing according to the embodiment of the present invention.

Referring to FIG. 7, the rendering manager 130 includes a rendering queue 131 for executing a rendering processing command, a painter 132 for performing drawing, and a VGLib 133 being a rendering Application Programming Interface (API) library.

The painter 132, which is a module for drawing in a drawing buffer, has an interface for using the VGLib 133. In case of drawing through the canvas module, an image may be drawn directly using the painter 132.

As is apparent from the above description, the rendering processing apparatus and method using multiprocessing according to the embodiments of the present invention can maximize image processing performance by dividing a calculation processing part and a drawing processing part for the images of frames and simultaneously processing the divided parts in a plurality of threads using multiprocessing.

The rendering method using multiprocessing according to the embodiment of the present invention may be written to a computer-readable recording medium as a program that can be executed by a computer. The computer-readable recording medium may include a program command, a data file, and a data structure alone or in combination. A program command written to the computer-readable recording medium may be specially designed and configured for the present invention or known to those skilled in the art of computer software. Examples of the computer-readable recording medium include a magnetic storage medium such as a hard disk, a floppy disk, or a magnetic tape, an optical medium such as a CD ROM or a DVD, a magneto-optical medium such as a floptical disk, and a hardware device specially configured to store and execute a program command, such as a ROM, a RAM, or a flash memory. Examples of a program command include a premium language code executable by a computer using an interpreter as well as a machine language code made by a compiler.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A rendering processing method using multiprocessing, comprising:

dividing an application execution window into frames and generating a rendering processing command for rendering processing of an image on a frame basis by a pre-rendering manager;

generating a rendering image for a frame according to the generated rendering processing command by a rendering manager; and storing the generated rendering image in a memory, wherein a task for generating a rendering processing command of each frame of the window is divided into at least one task for generating a rendering processing command and a task for generating a rendering image of each frame of the window is divided into at least one task for generating a rendering image, wherein said one or more task for generating the rendering processing command and said one or more task for generating the rendering image are processed simultaneously in a plurality of threads, and wherein a task for generating a rendering processing command of a first frame of the window and a task for generating a rendering image of a second frame of the window are simultaneously processed in a plurality of threads at a specific time of a rendering processing.

2. The rendering processing method according to claim 1, wherein the divided tasks are sequentially processed on a frame basis.

3. The rendering processing method according to claim 1, wherein the generation of a rendering image comprises generating the rendering image in a form of a bitmap.

4. The rendering processing method according to claim 1, wherein the generation of a rendering processing command comprises, when a Scene Graph (SC) optimizer determines that a plurality of processing requests are successively received for generation of a same image at a same coordinates in a frame by scanning a pre-rendering queue that receives the rendering processing requests, controlling processing of only one of the plurality of processing requests.

5. A computer-readable recording medium for recording a program that performs the rendering processing method according to claim 1.

6. A rendering processing apparatus using multiprocessing, comprising:
- a pre-rendering manager for dividing an application execution window into frames and generating a rendering processing command for rendering processing of an image on a frame basis;
- a rendering manager for generating a rendering image for a frame according to the generated rendering processing command; and
- a memory for storing the generated rendering image, wherein
- a task for generating a rendering processing command of each frame of the window is divided into one or more task for generating a rendering processing command and a task for generating a rendering image of the each frame is divided into one or more task for generating a rendering image, and
- wherein the one or more task for generating the rendering processing command and the one or more task for generating the rendering image are processed in a plurality of threads, and
- wherein a task for generating a rendering processing command of a first frame of the window and a task for generating a rendering image of a second frame of the window are simultaneously processed in a plurality of threads at a specific time of a rendering processing.

7. The rendering processing apparatus according to claim 6, wherein the divided tasks are sequentially processed on a frame basis.

8. The rendering processing apparatus according to claim 6, wherein the rendering manager generates the rendering image in a form of a bitmap.

9. The rendering processing apparatus according to claim 6, wherein the pre-rendering manager comprises:
- a pre-rendering queue for receiving an image processing event command; and
- a Scene Graph (SC) optimizer for, if determining that a plurality of rendering processing requests are successively received for generation of a same image at a same coordinates in a frame by scanning the pre-rendering queue, controlling processing of only one of the plurality of processing requests.

* * * * *